(12) United States Patent
Rahman et al.

(10) Patent No.: US 11,809,808 B2
(45) Date of Patent: Nov. 7, 2023

(54) SYSTEM, METHOD, AND COMPUTER PROGRAM PRODUCT FOR CLASSIFYING SERVICE REQUEST MESSAGES

(71) Applicant: Visa International Service Association, San Francisco, CA (US)

(72) Inventors: Mohammad Ziaur Rahman, Singapore (SG); Xuan Phi Nguyen, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/062,032

(22) Filed: Dec. 6, 2022

(65) Prior Publication Data
US 2023/0094473 A1 Mar. 30, 2023

Related U.S. Application Data

(63) Continuation of application No. 17/056,121, filed as application No. PCT/US2018/033353 on May 18, 2018, now Pat. No. 11,544,445.

(51) Int. Cl.

| | |
|---|---|
| *G06F 40/126* | (2020.01) |
| *G06F 17/16* | (2006.01) |
| *G06N 3/04* | (2023.01) |
| *G06Q 10/0631* | (2023.01) |
| *G06N 3/082* | (2023.01) |
| *G06F 40/10* | (2020.01) |
| *G06N 3/045* | (2023.01) |

(Continued)

(52) U.S. Cl.
CPC ............ *G06F 40/126* (2020.01); *G06F 17/16* (2013.01); *G06N 3/04* (2013.01); *G06Q 10/06311* (2013.01); *G06F 40/10* (2020.01);
*G06N 3/045* (2023.01); *G06N 3/048* (2023.01); *G06N 3/082* (2013.01); *G06Q 10/0631* (2013.01)

(58) Field of Classification Search
CPC ........ G06F 40/126; G06F 17/16; G06F 40/10; G06N 3/04; G06N 3/045; G06N 3/048; G06N 3/082; G06Q 10/06311; G06Q 10/0631
See application file for complete search history.

(56) References Cited

U.S. PATENT DOCUMENTS

| | | |
|---|---|---|
| 6,763,101 B2 | 7/2004 | Lautenschlager et al. |
| 2010/0017487 A1 | 1/2010 | Patinkin |

(Continued)

FOREIGN PATENT DOCUMENTS

WO   2015072085 A1   3/2017

*Primary Examiner* — Quoc A Tran
(74) *Attorney, Agent, or Firm* — THE WEBB LAW FIRM

(57) ABSTRACT

Provided is a method for classifying information technology (IT) service request messages. The method may include receiving data associated with an IT service request message, determining a plurality of number values associated with a plurality of characters included in the IT service request message, generating a vector that includes index values, generating a first bitmap based on generating the vector, generating a second bitmap based on the first bitmap, where the second bitmap has a first dimension and a second dimension, and where the first dimension and the second dimension are equal, and determining a classification of the IT service request message using a neural network algorithm. A system and computer program product are also disclosed.

17 Claims, 10 Drawing Sheets

(51) Int. Cl.
  *G06N 3/048* (2023.01)
  *G06F 17/00* (2019.01)

(56) References Cited

U.S. PATENT DOCUMENTS

| | | | |
|---|---|---|---|
| 2011/0246404 A1 | 10/2011 | Lehmann et al. | |
| 2017/0244737 A1* | 8/2017 | Kuperman | G06N 3/084 |
| 2019/0166141 A1* | 5/2019 | Xu | G06N 3/047 |
| 2019/0294676 A1* | 9/2019 | Sapugay | G06N 5/022 |

* cited by examiner

SYSTEM, METHOD, AND COMPUTER PROGRAM PRODUCT FOR CLASSIFYING SERVICE REQUEST MESSAGES

CROSS REFERENCE TO RELATED APPLICATIONS

This application is a continuation of U.S. patent application Ser. No. 17/056,121, filed May 18, 2018, which is the United States national phase of International Application No. PCT/US2018/033353 filed May 18, 2018, the disclosures of which are hereby incorporated by reference in their entirety.

BACKGROUND

1. Technical Field

This disclosure relates generally to systems, devices, products, apparatus, and methods that are used for classifying service request messages and in non-limiting embodiments, to a system, product, and method for classifying service request messages associated with information technology services.

2. Technical Considerations

Information technology service management (ITSM) includes activities that are performed by an organization to design, plan, deliver, operate, and/or control information technology (IT) services offered to customers. In some examples, ITSM may be directed by policies of the organization, and ITSM may be organized and structured in processes and supporting procedures based on the policies of the organization. ITSM may be concerned with the implementation of IT services that meet a customer's needs. Additionally, ITSM may be performed by an IT service provider using people, processes, and/or IT solutions.

An issue tracking system (e.g., a trouble ticket system, a support ticket system, a request management system, an incident ticket system, and/or the like) may include a computing device that includes software to manage issues and/or maintain a list of issues, as needed by an organization. An issue tracking system may be used by an operator in an organization's customer support call center to create messages associated with an issue, update a status associated with an issue, and/or resolve an issue. For example, an operator of an issue tracking system may create messages associated with an issue, update a status associated with an issue, and/or resolve an issue, where the issue was reported by an organization's employees and/or reported by a customer.

In some instances, an operator of an issue tracking system may create a ticket that includes a running report on an issue. The ticket may include a status of the issue associated with the ticket, a description of the issue associated with the ticket, and/or other data that is relevant to the issue. The operator of the issue tracking system may assign a label to the ticket based on the status of the issue associated with the ticket, a description of the issue associated with the ticket, and/or other data that is relevant to the issue. The label may be associated with a category of a work group that is tasked with correcting the issue.

However, the label assigned to the ticket by the operator of the issue tracking system may be incorrect. In this way, the issue tracking system may expend time and networking resources associated with communicating the ticket to a work group that is not the correct work group to correct the issue associated with the ticket. For example, the issue tracking system may communicate messages to and/or receive messages from a work group that is not tasked with correcting the issue associated with the ticket.

SUMMARY

Accordingly, improved systems, devices, products, apparatus, and/or methods for classifying service request messages are disclosed.

According to some non-limiting embodiments, provided is a method for classifying information technology (IT) service request messages. The method comprises receiving, with at least one processor, data associated with an information technology (IT) service request message, wherein the data associated with the IT service request message comprises a plurality of characters associated with text regarding an IT service request; processing, with at least one processor, the data associated with the IT service request message to generate an input to a neural network algorithm, wherein processing the data associated with the IT service request message comprises: determining, with at least one processor, a plurality of number values associated with the plurality of characters included in the IT service request message; generating a vector that includes index values based on the plurality of number values associated with the plurality of characters included in the IT service request message; generating a first bitmap based on generating the vector, wherein the first bitmap has a first dimension and a second dimension; generating a second bitmap based on the first bitmap, wherein the second bitmap has a first dimension and a second dimension, and wherein the second dimension of the first bitmap, the first dimension of the second bitmap, and the second dimension of the second bitmap are equal; determining, with at least one processor, a classification of the IT service request message based on the input to the neural network algorithm; and communicating, with the at least one processor, classification data associated with the classification of the information technology request message.

According to some non-limiting embodiments, provided is a system for classifying information technology (IT) service request messages. The system comprises at least one processor programmed or configured to: receive data associated with an information technology (IT) service request message, wherein the data associated with the IT service request message comprises a plurality of characters associated with text regarding an information technology request; determine a plurality of number values associated with the plurality of characters included in the IT service request message; generate a vector that includes a plurality of index values based on the plurality of number values associated with the plurality of characters included in the IT service request message; generate a first bitmap based on the vector; generate a second bitmap based on the first bitmap, wherein the second bitmap has a first dimension and a second dimension, and where the first dimension and the second dimension are equal; determine a classification of the IT service request message using a convolutional neural network algorithm; and communicate classification data associated with the classification of the information technology request message.

According to some non-limiting embodiments, provided is a computer program product for classifying information technology (IT) service request messages. The computer program product comprises at least one non-transitory computer-readable medium including one or more instructions that, when executed by at least one processor, cause the at least one processor to: receive data associated with an information technology (IT) service request message, wherein the data associated with the IT service request message comprises a plurality of characters associated with text regarding an information technology request; determine a plurality of number values associated with the plurality of characters included in the IT service request message; generate a vector that includes index values based on the plurality of number values associated with the plurality of characters included in the IT service request message; generate a first bitmap based on generating the vector; generate a second bitmap based on the first bitmap, wherein the second bitmap has a first dimension and a second dimension, and where the first dimension and the second dimension are equal; determine a classification of the IT service request message using a neural network algorithm; and communicate classification data associated with the classification of the information technology request message.

Further non-limiting embodiments or aspects are set forth in the following numbered clauses:

Clause 1: A method for classifying information technology (IT) service request messages, the method comprising: receiving, with at least one processor, data associated with an information technology (IT) service request message, wherein the data associated with the IT service request message comprises a plurality of characters associated with text regarding an IT service request; processing, with at least one processor, the data associated with the IT service request message to generate an input to a neural network algorithm, wherein processing the data associated with the IT service request message comprises: determining, with at least one processor, a plurality of number values associated with the plurality of characters included in the IT service request message; generating a vector that includes index values based on the plurality of number values associated with the plurality of characters included in the IT service request message; generating a first bitmap based on generating the vector, wherein the first bitmap has a first dimension and a second dimension; generating a second bitmap based on the first bitmap, wherein the second bitmap has a first dimension and a second dimension, and wherein the second dimension of the first bitmap, the first dimension of the second bitmap, and the second dimension of the second bitmap are equal; determining, with at least one processor, a classification of the IT service request message based on the input to the neural network algorithm; and communicating, with the at least one processor, classification data associated with the classification of the IT service request message.

Clause 2: The method of clause 1, further comprising formatting the data associated with the IT service request message based on an embedding layer of the neural network algorithm.

Clause 3: The method of clauses 1 or 2, wherein the plurality of characters associated with the text regarding the IT service request comprise a plurality of characters associated with machine generated text regarding the IT service request, and wherein the plurality of number values associated with the plurality of characters comprise an integer value associated with each character of the plurality of characters associated with the machine generated text regarding the IT service request.

Clause 4: The method of any of clauses 1-3, wherein generating the vector that includes the plurality of index values based on the plurality of number values associated with the plurality of characters included in the IT service request message comprises: referencing the plurality of index values to a row of a 2D matrix, wherein the 2D matrix comprises a pre-defined embedding length associated with the convolution neural network algorithm.

Clause 5: The method of any of clauses 1-4, wherein the pre-defined embedding length is 32 units.

Clause 6: The method of any of clauses 1-5, wherein generating the second bitmap based on the first bitmap comprises: multiplying the first bitmap by a vector having a first dimension and a second dimension, wherein the first dimension of the vector is equal to the second dimension of the first bitmap.

Clause 7: The method of any of clauses 1-6, wherein further comprising determining the plurality of index values based on the plurality of number values associated with the plurality of characters included in the IT service request message.

Clause 8: A system for classifying information technology (IT) service request messages, comprising: at least one processor programmed or configured to: receive data associated with an information technology (IT) service request message, wherein the data associated with the IT service request message comprises a plurality of characters associated with text regarding the IT service request message; determine a plurality of number values associated with the plurality of characters included in the IT service request message; generate a vector that includes a plurality of index values based on the plurality of number values associated with the plurality of characters included in the IT service request message; generate a first bitmap based on the vector; generate a second bitmap based on the first bitmap, wherein the second bitmap has a first dimension and a second dimension, and wherein the first dimension and the second dimension are equal; determine a classification of the IT service request message using a convolutional neural network algorithm; and communicate classification data associated with the classification of the IT service request message.

Clause 9: The system of clause 8, wherein the at least one processor is further programmed or configured to: format the data associated with the IT service request message based on an embedding layer of the convolutional neural network algorithm.

Clause 10: The system of clauses 8 or 9, wherein, when formatting the data associated with the IT service request message based on an embedding layer of the convolutional neural network algorithm, the at least one processor is further programmed or configured to: removing one or more characters from the plurality of characters associated with text regarding the IT service request message.

Clause 11: The system of any of clauses 8-10, wherein the plurality of characters associated with the text regarding the IT service request comprise a plurality of characters associated with machine generated text regarding the IT service request, and wherein the plurality of number values associated with the plurality of characters comprise an integer value associated with each character of the plurality of characters associated with the machine generated text regarding the IT service request.

Clause 12: The system of any of clauses 8-11, wherein, when generating the vector that includes the plurality of index values based on the plurality of number values associated with the plurality of characters included in the IT service request message, the at least one processor is programmed or configured to: reference the plurality of index values to a row of a 2D matrix, wherein the 2D matrix comprises a pre-defined embedding length associated with the convolution neural network algorithm.

Clause 13: The system of any of clauses 8-12, wherein the pre-defined embedding length is 32 units.

Clause 14: The system of any of clauses 8-13, wherein, when generating the second bitmap based on the first bitmap, the at least one processor is programmed or configured to: multiply the first bitmap by a vector having a first dimension and a second dimension, wherein the first dimension of the vector is equal to the second dimension of the first bitmap.

Clause 15: The system of any of clauses 8-14, wherein the at least one processor is further programmed or configured to: determine the plurality of index values based on the plurality of number values associated with the plurality of characters included in the IT service request message.

Clause 16: A computer program product for classifying information technology (IT) service request messages, the computer program product comprising at least one non-transitory computer-readable medium including one or more instructions that, when executed by at least one processor, cause the at least one processor to: receive data associated with an information technology (IT) service request message, wherein the data associated with the IT service request message comprises a plurality of characters associated with text regarding an information technology request; determine a plurality of number values associated with the plurality of characters included in the IT service request message; generate a vector that includes index values based on the plurality of number values associated with the plurality of characters included in the IT service request message; generate a first bitmap based on generating the vector; generate a second bitmap based on the first bitmap, wherein the second bitmap has a first dimension and a second dimension, and where the first dimension and the second dimension are equal; determine a classification of the IT service request message using a neural network algorithm; and communicate classification data associated with the classification of the IT service request message.

Clause 17: The computer program product of clause 16, wherein the first bitmap has a first dimension and a second dimension and wherein the second dimension of the first bitmap, the first dimension of the second bitmap, and the second dimension of the second bitmap are equal.

Clause 18: The computer program product of clauses 16 or 17, wherein the one or more instructions further cause the at least one processor to: determine the plurality of index values based on the plurality of number values associated with the plurality of characters included in the IT service request message.

Clause 19: The computer program product of any of clauses 16-18, wherein the one or more instructions that cause the at least one processor to generate the vector that includes the plurality of index values based on the plurality of number values associated with the plurality of characters included in the IT service request message, cause the at least one processor to: reference the plurality of index values to a row of a 2D matrix, wherein the 2D matrix comprises a pre-defined embedding length associated with the convolution neural network algorithm.

Clause 20: The computer program product of any of clauses 16-19, wherein the one or more instructions that cause the at least one processor to generate the second bitmap based on the first bitmap, cause the at least one processor to: multiply the first bitmap by a vector having a first dimension and a second dimension, wherein the first dimension of the vector is equal to a dimension of the first bitmap.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
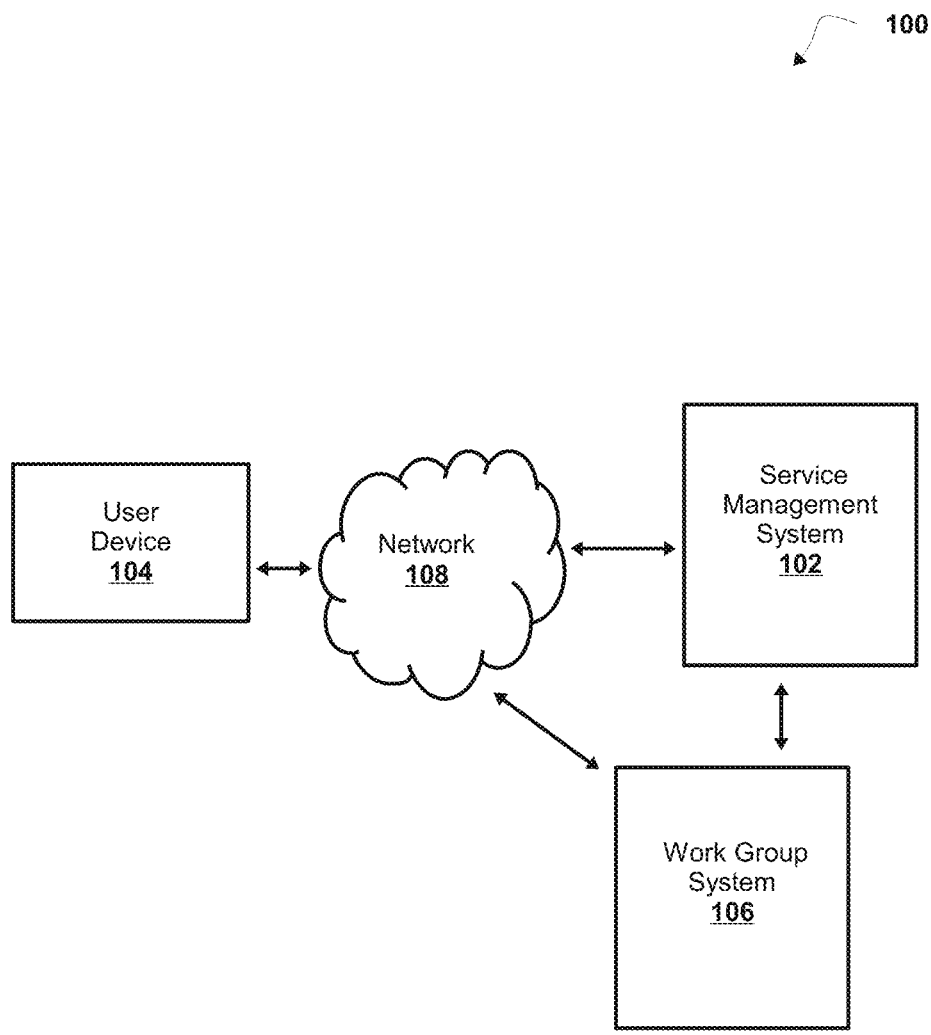
FIG. 1 is a diagram of some non-limiting embodiments of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "communicate" may refer to the reception, receipt, transmission, transfer, provision, and/or the like of information (e.g., data, signals, messages, instructions, commands, and/or the like). As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments, a message may refer to a packet (e.g., a data packet, a network packet, and/or the like) that includes data.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein, the term "transaction service provider system" may refer to one or more systems operated by or operated on behalf of a transaction service provider, such as a transaction service provider system executing one or more software applications associated with the transaction service provider. In some non-limiting embodiments, a transaction service provider system may include one or more servers operated by or operated on behalf of a transaction service provider.

As used herein, the term "issuer" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions). For example, an issuer may provide an account identifier, such as a primary account number (PAN), to a user that uniquely identifies one or more accounts associated with the user. The account identifier may be used by the user to conduct a payment transaction. In some non-limiting embodiments, the account identifier may be embodied on a portable financial device, such as a physical financial instrument (e.g., a payment card) and/or may be electronic and used for electronic payments. In some non-limiting embodiments, an issuer may be associated with a bank identification number (BIN) that uniquely identifies the issuer. As used herein, the term "issuer system" may refer to one or more systems operated by or operated on behalf of an issuer. For example, an issuer system may refer to a server executing one or more software applications associated with the issuer. In some non-limiting embodiments, an issuer system may include one or more servers (e.g., one or more authorization servers) for authorizing a payment transaction.

As used herein, the term "client device" may refer to one or more devices (e.g., client-side devices) or one or more systems (e.g., client-side systems), which are remote from a server, used to access a functionality provided by the server. For example, a client device may include one or more computing devices (e.g., one or more computing machines, one or more computers, one or more processors, one or more information processing systems, and/or the like), cellular phones, smartphones, wearable devices (e.g., watches, glasses, lenses, clothing, and/or the like), personal digital assistants (PDAs), and/or the like.

As used herein, the term "server" may refer to one or more devices that provide a functionality to one or more devices (e.g., one or more client devices) via a network (e.g., a public network, a private network, the Internet, and/or the like). For example, a server may include one or more computing devices.

As used herein, the term "system" may refer to one or more devices that are connected or are configured to be connected with one or more other devices. For example, a system may include a plurality of computing devices that include software applications, where the plurality of computing devices are connected via a network.

In some non-limiting embodiments, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present disclosure are directed to systems, methods, and computer program products for classifying service request messages. In some non-limiting embodiments, a method may include receiving data associated with a service request message, determining a plurality of number values associated with the plurality of characters included in the service request message, generating a vector that includes index values, generating a first bitmap based on generating the vector, generating a second bitmap based on the first bitmap, where the second bitmap has a first dimension and a second dimension, and where the first dimension and the second dimension are equal, and determining a classification of the service request message using a neural network algorithm.

Accordingly, non-limiting embodiments of the present disclosure may accurately and efficiently determine a classification of the service request message. In this way, non-limiting embodiments of the present disclosure may reduce an amount of time and an amount of networking resources associated with communicating a service request message to a work group that is the correct work group to perform operations associated with an issue regarding the service request message. For example, non-limiting embodiments of the present disclosure may reduce the number of messages communicated to and/or messages received from a work group that is not the correct work group to perform operations associated with the issue regarding the service request message.

Referring now to FIG. 1, FIG. 1 is a diagram of an example environment 100 in which devices, systems, and/or methods, described herein, may be implemented. As shown in FIG. 1, environment 100 includes service management system 102, user device 104, and network 108. Service management system 102 and/or user device 104 may interconnect (e.g., establish a connection to communicate) via wired connections, wireless connections, or a combination of wired and wireless connections.

Service management system 102 may include one or more devices capable of receiving information from user device 104, work group system 106, and/or other devices via network 108, and/or communicating information to user device 104, work group system 106, and/or other devices via network 108. For example, service management system 102 may include one or more computing devices, such as a server (e.g., a transaction processing server), a group of servers, and/or other like devices. In some non-limiting embodiments, service management system 102 may be associated with a financial institution, a transaction service provider, and/or an issuer as described herein. For example, service management system 102 may be operated by a financial institution, a transaction service provider, and/or an issuer. In some non-limiting embodiments, service management system 102 may include user device 104 and/or work group system 106. For example, user device 104 and/or work group system 106 may be a component of service management system 102.

User device 104 may include one or more devices capable of receiving information from service management system 102, work group system 106, and/or another device (e.g., another user device 104) via network 108 and/or communicating information to service management system 102, work group system 106, and/or another device (e.g., another user device 104) via network 108. For example, user device 104 may include one or more computing devices, such as one or more servers, one or more routers, one or more modems, one or more desktop computers, one or more portable computers (e.g., one or more tablet computers, one or more laptop computers, and/or the like), one or more mobile devices (e.g., cellular phones, smartphones, PDAs, and/or the like), and/or the like.

Work group system 106 may include one or more devices capable of receiving information from service management system 102, user device 104, and/or another device (e.g., another user device 104) via network 108 and/or communicating information to service management system 102, user device 104, and/or another device (e.g., another user device 104) via network 108. For example, work group system 106 may include one or more computing devices, such as one or more servers, one or more routers, one or more modems, one or more desktop computers, one or more portable computers (e.g., one or more tablet computers, one or more laptop computers, and/or the like), one or more mobile devices (e.g., cellular phones, smartphones, PDAs, and/or the like), and/or the like. In some non-limiting embodiments, work group system 106 may be associated with one or more work groups. A work group may include a group of individuals that are responsible for correcting an issue for an organization. For example, a work group may include a group of individuals employed by the organization that are responsible for correcting issues associated with a service request message received by a device associated with the work group.

Network 108 may include one or more wired and/or wireless networks. For example, network 108 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
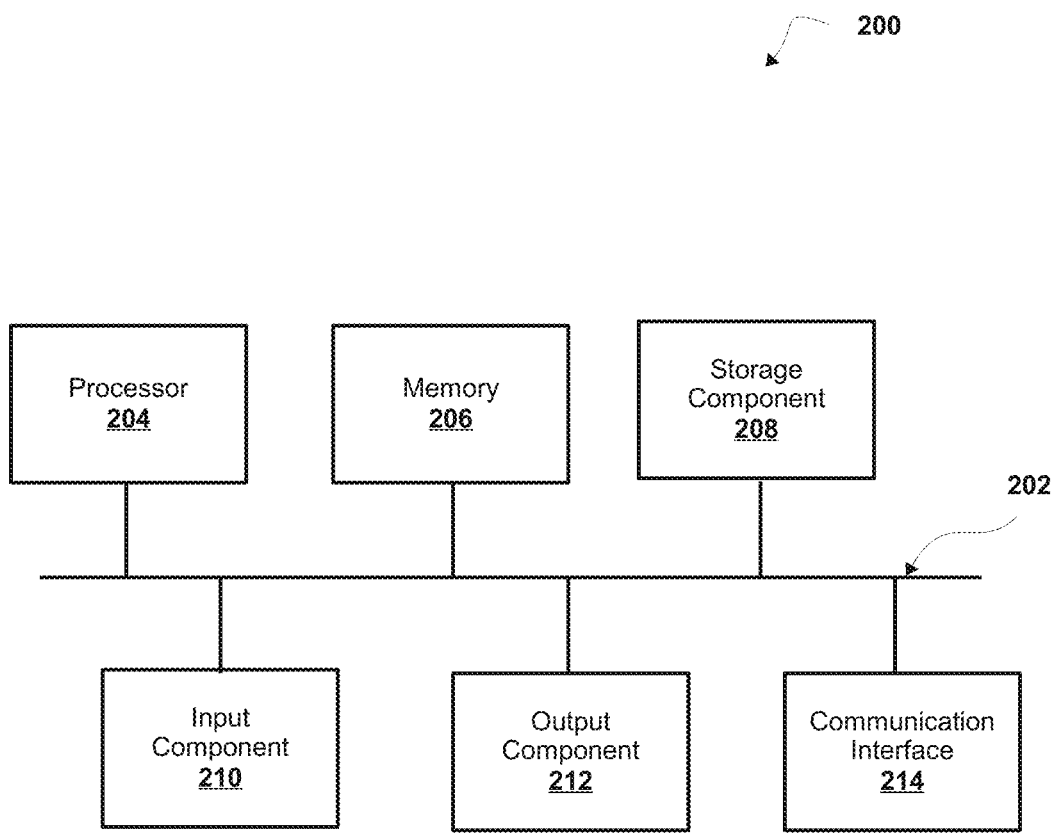
FIG. 2 is a diagram of some non-limiting embodiments of components of one or more devices of FIG. 1.

Referring now to FIG. 2, FIG. 2 is a diagram of example components of a device 200. Device 200 may correspond to service management system 102, user device 104, work group system 106, and/or one or more devices of service management system 102, or one or more devices of work group system 106. In some non-limiting embodiments, service management system 102, user device 104, and/or work group system 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, non-limiting embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
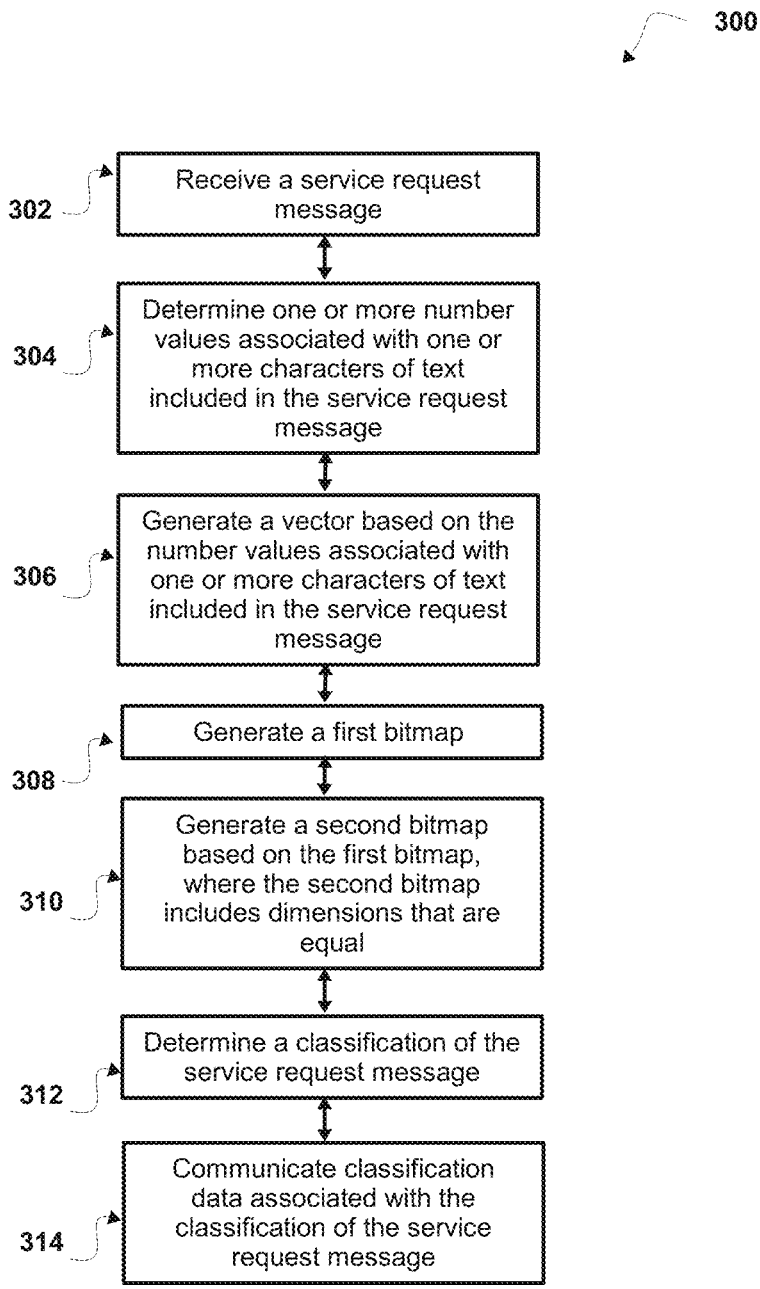
FIG. 3 is a flowchart of some non-limiting embodiments of a process for classifying service request messages.

Referring now to FIG. 3, FIG. 3 is a flowchart of some non-limiting embodiments of a process 300 for classifying service request messages. In some non-limiting embodiments, one or more of the steps of process 300 may be performed (e.g., completely, partially, etc.) by service management system 102 (e.g., one or more devices of service management system 102). In some non-limiting embodiments, one or more of the steps of process 300 may be performed (e.g., completely, partially, etc.) by another device or a group of devices separate from or including service management system 102, such as user device 104.

As shown in FIG. 3, at step 302, process 300 includes receiving a service request message. For example, service management system 102 may receive a service request message (e.g., an information technology (IT) service request message) from a computing device (e.g., user device 104). In some non-limiting embodiments, the service request message may include text. For example, the service request message may include text provided by a person (e.g., text provided by a person associated with user device 104, text that includes natural language input by a person associated with user device 104, and/or the like) and/or text that is generated by a computing device (e.g., text that includes machine-generated text, text that include natural language generated by a computing device, and/or the like). In some non-limiting embodiments, the text that is generated by the computing device may be associated with a device log associated with the computing device, an event associated with the computing device, a transaction associated with the computing device, and/or the like. For example, the text that is generated by the computing device may be associated with a failure of the computing device, an error of the computing device, a power-down situation of the computing device, a power-up situation of the computing device, and/or the like.

In some non-limiting embodiments, the text included in the service request message may include one or more characters. For example, the text may include a sequence of characters that are associated with a vocabulary that includes a predetermined number of alphanumeric characters and/or symbols. In one example, the vocabulary may include the following 70 characters:
<space>abcdefghijklmnopqrstuvwxyz0123456789,;.!?: '\"/\|_@#$%^&*~'+-=< >( ) [ ]{ }

In some non-limiting embodiments, service management system 102 may receive a service request message based on a computing device generating the service request message automatically. For example, the computing device may generate data associated with a failure, an error, a power-down situation, a power-up situation, and/or the like, and generate a message (e.g., a service request message) that includes the data. The computing device may communicate the message to service management system 102 based on generating the data, and service management system 102 may receive the message.

In some non-limiting embodiments, service management system 102 may receive a service request message based on a computing device (e.g., user device 104) generating the service request message based on an input received from a person. For example, the computing device may receive data associated with a failure, an error, a power-down situation, a power-up situation, and/or the like, based on an input provided by a person, and the computing device may generate a message (e.g., a service request message) that includes the data. The computing device may communicate the message to service management system 102 based on the person causing the message to be communicated, and service management system 102 may receive the message.

In some non-limiting embodiments, service management system 102 may determine whether one or more characters of text included in the service request message are part of a vocabulary. For example, service management system 102 may compare the one or more characters of text included in the service request message to one or more characters that are part of the vocabulary. If service management system 102 determines that the one or more characters of text included in the service request message correspond to one or more characters of the vocabulary, service management system 102 may determine that the one or more characters of text included in the service request message are part of a vocabulary. If service management system 102 determines that the one or more characters of text included in the service request message do not correspond to one or more characters of the vocabulary, service management system 102 may determine that the one or more characters of text included in the service request message are not part of a vocabulary.

In some non-limiting embodiments, service management system 102 may format the text included in the service request message. In one example, service management system 102 may determine that one or more characters of text included in the service request message do not correspond to one or more characters of the vocabulary. Service management system 102 may replace the one or more characters of text that do not correspond to the one or more characters of the vocabulary with one or more characters that are part of the vocabulary.

In another example, service management system 102 may determine whether a sequence of characters of the text is less than, equal to, or greater than a predetermined length (e.g., a predetermined length of characters). If service management system 102 determines that the sequence is less than the predetermined length, service management system 102 may add one or more characters (e.g., a blank space) to the sequence. If service management system 102 determines that the sequence is equal to the predetermined length, service management system 102 may forego making changes to the sequence. If service management system 102 determines that the sequence is greater than the predetermined length, service management system 102 may remove one or more characters from the sequence (e.g., truncate one or more characters between a beginning and an end of the sequence, truncate one or more characters from an end of the sequence, truncate one or more characters from a beginning of the sequence, and/or the like). In some non-limiting embodiments, the predetermined length may be equal to 1024 characters.

As further shown in FIG. 3, at step 304, process 300 includes determining one or more number values associated with one or more characters included in the service request message. For example, service management system 102 may determine a plurality of number values associated with a plurality of characters (e.g., a plurality of characters of text) included in the service request message. In another example, service management system 102 may determine a number value associated with each character of text included in the service request message.

In some non-limiting embodiments, service management system 102 may encode one or more characters of text included in the service request message based on a vocabulary. For example, service management system 102 may encode the one or more characters of text included in the service request message based on an array of values associated with the vocabulary. In some non-limiting embodiments, service management system 102 may generate an index for each of the one or more characters of text using an array of values associated with the vocabulary. The index may include a number value (e.g., an integer value) corresponding to each of the one or more characters of text included in the service request message. The array of values associated with the vocabulary may include a number value associated with each character of the vocabulary.

As further shown in FIG. 3, at step 306, process 300 includes generating a vector based on the number values associated with one or more characters of text included in the service request message. For example, service management system 102 may generate a vector that includes the number values associated with one or more characters of text included in the service request message. In some non-limiting embodiments, the vector may include indexed integer values that are based on a correspondence between the plurality of characters included in the service request message and an array of a vocabulary.

In some non-limiting embodiments, service management system 102 may reference an index associated with one or more characters of text included in a service request message to a portion of a two-dimensional (2D) matrix (e.g., a uniformly randomized 2D matrix) to create a vector for each of the one or more character of text included in the service message. For example, service management system 102 may reference each index associated with one or more characters of text included in a service request message to a row of a uniformly randomized two-dimensional (2D) matrix. In some non-limiting embodiments, the 2D matrix may have a first dimension (e.g., a length) that is equal to the predetermined number of alphanumeric characters and/or symbols that are included in a vocabulary. For example, the first dimension may be equal to 70. Additionally or alternatively, the 2D matrix may have a second dimension (e.g., a width or a height) that is equal to a length of an embedding layer (e.g., a predetermined length of an embedding layer, a predetermined length of 32 characters, and/or the like). In some non-limiting embodiments, the 2D matrix may be initialized using an Xavier initialization.

In some non-limiting embodiments, service management system 102 may reference an index (e.g., an index associated with one or more characters of text included in a service request message) to a row of a uniformly randomized 2D matrix to embed the index into a dense vector with uniformly random values. For example, service management system 102 may multiply the index by a value in the row of the uniformly randomized two-dimensional (2D) matrix to embed the index into the dense vector.

As further shown in FIG. 3, at step 308, process 300 includes generating a first bitmap. For example, service management system 102 may generate a first bitmap based on generating the vector using the number values associated with one or more characters of text included in the service request message. In some non-limiting embodiments, the first bitmap may include a first dimension (e.g., a length) and a second dimension (e.g., a width or a height), where the first dimension (e.g., 1024) is larger than the second dimension (e.g., 32). For example, the first bitmap may include the first dimension that is much larger than the second dimension, where the first dimension is larger than the second dimension by a multiplication factor. In some non-limiting embodiments, the first dimension and/or the second dimension may be equal to a number that is derived as a power of two (e.g., $2^n$, where n=1, 2, 3, 4, 5, etc.)

In some non-limiting embodiments, the second dimension may be equal to a length of an embedding layer (e.g., a predetermined length of an embedding layer, a predetermined length of 32 characters, and/or the like). In some non-limiting embodiments, the 2D matrix may be initialized using an Xavier initialization.

As further shown in FIG. 3, at step 310, process 300 includes generating a second bitmap based on the first bitmap, where the second bitmap includes dimensions that are square. For example, service management system 102 may generate the second bitmap based on the first bitmap, where the second bitmap includes a first dimension and a second dimension that are equal.

In some non-limiting embodiments, service management system 102 may generate the second bitmap based on the first bitmap by multiplying the first bitmap by a vector (e.g., a weight vector) that has a first dimension (e.g., a length) and a second dimension (e.g., a width or a height), where the second dimension is larger than the first dimension. In some non-limiting embodiments, the first dimension of the vector may be equal to a length of an embedding layer (e.g., a predetermined length of an embedding layer, a predetermined length of 32 characters, and/or the like). In some non-limiting embodiments, the first dimension of the vector may be equal to the second dimension of the first bitmap. Additionally or alternatively, the second dimension of the vector may be equal to the first dimension of the first bitmap.

As further shown in FIG. 3, at step 312, process 300 includes determining a classification of the service request message. For example, service management system 102 may determine the classification of the service request message based on the second bitmap. In some non-limiting embodiments, service management system 102 may determine the classification of the service request message based on providing a bitmap (e.g., a first bitmap or a second bitmap) as an input to a service request message classification model. In some non-limiting embodiments, the service request message classification model may include a convolution neural network model.

By providing a second bitmap that includes dimensions that are equal as an input to a service request message classification model that includes a convolution neural network model, service management system 102 may reduce processing time associated with determining a classification of a system request message because the dimensions of the second bitmap do not require as many convolutional layers to capture long-term dependencies, due to the locality of convolution layers and pooling layers, as compared to the dimensions of a first bitmap, which includes a first dimension (e.g., a length) that is larger than a second dimension (e.g., a height or a width).

In some non-limiting embodiments, service management system 102 may generate a service request message classification model. For example, service management system 102 may generate a service request message classification model based on data associated with a service request message (e.g., data associated with text included in a service request message, data associated with one or more characters of text included in a service request message, and/or the like).

In some non-limiting embodiments, the service request message classification model (e.g., a multinomial classification model) may be designed to receive, as an input, data associated with one or more service request messages (e.g., text included in one or more service request messages), and provide, as an output, a prediction as to a category of (e.g., a category associated with a work group to which the service request message may be communicated) the one or more service request messages. For example, the service request message classification model may receive the input and may provide the output that includes a prediction of a category of a plurality of categories (e.g., a category associated with a work group of a plurality of categories associated with a plurality of work groups) to which the one or more service request messages should be assigned.

In some non-limiting embodiments, the service request message classification model may be designed to receive, as an input, one or more variables associated with a service request message, which may be identified as predictor variables and associated with text included in a service request message (e.g., one or more characters of text included in a service request message), and provide, as an output, a prediction (e.g., a probability, a binary output, a yes-no output, a score, a prediction score, and/or the like) that the service request message should be assigned to a category of a plurality of categories (e.g., a category associated with a work group of a plurality of categories associated with a plurality of work groups).

In some non-limiting embodiments, service management system 102 may receive data from user device 104 and/or other devices (e.g., other user devices 104). Service management system 102 may analyze the data to generate the service request message classification model based on receiving the data. In some non-limiting embodiments, service management system 102 may generate the service request message classification model by generating a rule for the service request message classification model based on the data (e.g., historical data) associated with a plurality of service request messages. In some non-limiting embodiments, historical data may include data associated with one or more service request messages that have been assigned to a work group.

In some non-limiting embodiments, service management system 102 may process the data to obtain training data for the service request message classification model. For example, service management system 102 may process the data to change the data into a format that may be analyzed (e.g., by service management system 102) to generate a service request message classification model. The data that is changed may be referred to as training data. In some non-limiting embodiments, service management system 102 may process the data to obtain the training data based on receiving the data. Additionally or alternatively, service management system 102 may process the data to obtain the training data based on service management system 102 receiving an indication that service management system 102 is to process the data from a user of service management system 102, such as when service management system 102 receives an indication to create a service request message classification model for a time interval corresponding to the data.

In some non-limiting embodiments, service management system 102 may process the data by determining a variable based on the data. A variable may include a metric, associated with a service request message, which may be derived based on the data. The variable may be analyzed to generate a service request message classification model. In one example, the variable may include a service request message summary variable associated with text included in a service request message and/or a hardware variable associated with hardware regarding a device (e.g., a hardware component associated with a device, a hardware component of a device, a hardware configuration item associated with a device, a hardware component associated with user device 104, a hardware configuration item associated with user device 104, and/or the like).

In some non-limiting embodiments, service management system 102 may analyze the training data to generate the service request message classification model. For example, service management system 102 may use machine learning techniques to analyze the training data to generate the service request message classification model. In some non-limiting embodiments, generating the service request message classification model (e.g., based on training data obtained from historical data) may be referred to as training the service request message classification model. In some non-limiting embodiments, the machine learning techniques may include supervised techniques, such as artificial neural networks (e.g., convolution neural networks) and/or the like. In some non-limiting embodiments, the service request message classification model may include a model that is specific to a particular work group, a particular set of work groups, a particular group of users, a particular group of clients of an organization, and/or the like. Additionally or alternatively, the service request message classification model may be specific to a particular organization. In some non-limiting embodiments, service management system 102 may generate one or more service request message classification models for one or more organizations, one or more work groups, and/or a particular group of users.

Additionally or alternatively, when analyzing the training data, service management system 102 may identify one or more variables (e.g., one or more independent variables) as predictor variables that may be used to make a prediction (e.g., when analyzing the training data). In some non-limiting embodiments, values of the predictor variables may be inputs to the service request message classification model. For example, service management system 102 may identify a subset (e.g., a proper subset) of the variables as predictor variables that may be used to accurately predict a work group to which a service request message may be assigned. In some non-limiting embodiments, the predictor variables may include one or more of the variables, as discussed above, which have a significant impact (e.g., an impact satisfying a threshold) on a probability that a service request message is to be assigned to a work group of a plurality of work groups as determined by service management system 102.

In some non-limiting embodiments, service management system 102 may validate the service request message classification model. For example, service management system 102 may validate the service request message classification model after service management system 102 generates the service request message classification model. In some non-limiting embodiments, service management system 102 may validate the service request message classification model based on a portion of the training data to be used for validation. For example, service management system 102 may partition the training data into a first portion and a second portion, where the first portion may be used to generate the service request message classification model, as described above. In this example, the second portion of the training data (e.g., the validation data) may be used to validate the service request message classification model.

In some non-limiting embodiments, service management system 102 may validate the service request message classification model by providing validation data associated with a work group (e.g., data associated with one or more service request message involving a work group, data associated with one or more service request message assigned to a work group, data associated with one or more service request message assigned to one or more work groups of a plurality of work groups, and/or the like) as input to the service request message classification model, and determining, based on an output of the service request message classification model, whether the service request message classification model correctly, or incorrectly, predicted that a service request message is to be assigned to a work group. In some non-limiting embodiments, service management system 102 may validate the service request message classification model based on a validation threshold. For example, service management system 102 may be configured to validate the service request message classification model when a threshold value (e.g., the validation threshold) of service request messages are correctly predicted by the service request message classification model (e.g., when the service request message classification model correctly predicts 50% of the service request messages are to be assigned to a work group, 70% of the service request messages are to be assigned to a work group, a threshold number of the service request messages are to be assigned to a work group, and/or the like).

In some non-limiting embodiments, if service management system 102 does not validate the service request message classification model (e.g., when a percentage of correctly predicted service request messages does not satisfy the validation threshold), then service management system 102 may generate additional service request message classification models.

In some non-limiting embodiments, once the service request message classification model has been validated, service management system 102 may further train the service request message classification model and/or create new service request message classification models based on receiving new training data. The new training data may include additional data associated with one or more service request messages. In some non-limiting embodiments, the new training data may include data relating to a prediction that one or more service request messages may be assigned to a work group. For example, service management system 102 may use the service request message classification model to predict that a service request message is to be assigned to a work group. In such an example, service management system 102 may have communicated data associated with a service request message to a device associated with a work group based on the prediction, and despite communicating the data associated with a service request message to the device associated with the work group, the work group did perform a service associated with the service request message. In such an example, service management system 102 may update one or more service request message classification models based on this new training data.

In some non-limiting embodiments, service management system 102 may store the service request message classification model. For example, service management system 102 may store the service request message classification model in a data structure (e.g., a database, a linked list, a tree, and/or the like). The data structure may be located within service management system 102 or external, and possibly remote from, service management system 102.

In some non-limiting embodiments, service management system 102 may use a service request message classification model to determine a work group to which a service request message is to be assigned. For example, service management system 102 may use the service request message classification model to determine a work group to which a service request message is to be assigned, where the service request message classification model is a convolutional neural network model that includes an input layer, two embedding layers, two convolution layers, two fully connected layers, and an output layer.

In some non-limiting embodiments, the two convolution layers (e.g., a first convolution layer and a second convolution layer) may be used by service management system 102 to perform one or more spatial two-dimensional (2D) convolution operations. For example, the two convolution layers may be used by service management system 102 to perform one or more spatial 2D convolution operations with a kernel size of three, a feature map depth that is doubled from a previous layer (e.g., a first layer will have 32 feature maps and a second layer will have 64 feature maps). Additionally or alternatively, the two convolution layers may include an activation operation (e.g., a ReLu function). Additionally or alternatively, the two convolution layers may include a max-pooling layer with a pool size of two and strides of two in two dimension (e.g., width and height).

In some non-limiting embodiments, an output from the two convolution layers (e.g., an output from a second convolution layer) may be provided by service management system 102 to the two fully connected layers. For example, the output from the two convolution layers may be provided by service management system 102 to the two fully connected layers and the output may be flattened, the output may be matrix-multiplied with a weight parameter, and/or a dropout process may be performed on the output. Additionally or alternatively, a shape of the output may be doubled after it is processed by service management system 102 using a fully connected layer of the two fully connected layers.

In some non-limiting embodiments, each fully connected layer includes an operation for flattening the input to the fully connected layer, an operation for multiplying the input with a weight having an output shape that is twice the output shape of the previous fully connected layer, an operation of activation with a ReLu function, and/or an operation of dropout with keeping a probability at a threshold of 0.7. In this way, the dropout should be regularized at a maximum rate of 0.7. In some non-limiting embodiments, a weight multiplication process in a second fully connected layer may produce an output (e.g., 256) that is twice an output (e.g., 128) that is produced in a first fully connected layer. In this way, the weight multiplication process may increase a capacity of a convolution neural network that includes the first and second fully connected layers.

In some non-limiting embodiments, a last fully connected layer of a plurality of fully connected layers may be an output layer. For example, a third fully connected layer of the three fully connected layers may be an output layer. In some non-limiting embodiments, the output layer may be used by service management system 102 to map an input to the output layer to determine a label (e.g., a label associated with a work group of a plurality of work groups, a label associated with a category of a work group of a plurality of categories of a plurality of work groups, and/or the like) for the input, and a SoftMax function may be applied by service management system 102 to the input to compute a probability associated with the label. In some non-limiting embodiments, a label may include classification data associated with the classification of the service request message. For example, the label may include classification data associated with the classification of the service request message, where the classification indicates a work group of a plurality of work groups to which the service request message is to be assigned, a category of a work group of a plurality of categories of work groups to which the service request message is to be assigned, and/or the like. In some non-limiting embodiments, service management system 102 may map the input to the output layer to determine the label for a service request message by multiplying the input layer with a weight of the output layer that has a shape that is the same as a space of the label.

As further shown in FIG. 3, at step 314, process 300 includes communicating classification data associated with the classification of the service request message. For example, service management system 102 may communicate classification data associated with the classification of the service request message to user device 104, work group system 106, and/or other devices. In some non-limiting embodiments, the classification data associated with the classification of the service request may include a label associated with a work group (e.g., a label associated with a category of a work group) to which the service request is to be assigned and/or communicated. In some non-limiting embodiments, service management system 102 may communicate the classification data based on determining a classification of the service request message. For example, service management system 102 may communicate (e.g., automatically) the classification data based on determining a classification of the service request message using a convolution neural network.

In some non-limiting embodiments, service management system 102 may generate a second service request message that includes classification data associated with a classification of a first service request message. For example, service management system 102 may receive the first service request message and service management system 102 may determine a classification of the first service request message. Service management system 102 may generate a second service message and include classification data associated with the classification of the first service request message in the second service message. In some non-limiting embodiments, service management system 102 may communicate the second service message based on the classification of the first service request message. For example, service management system 102 may communicate the second service message to work group system 106 (e.g., a work group associated with work group system 106) based on the classification of the first service request message.

In some non-limiting embodiments, service management system 102 may store classification data associated with the classification of the service request message. For example, service management system 102 may store the classification data associated with the classification of the service request message in a data structure that may be accessed by work group system 106. In some non-limiting embodiments, service management system 102 may store classification data associated with a classification of a first service request message in a queue (e.g., a queue associated with work group system 106) that may be accessed by work group system 106, and service management system 102 may communicate a second service request message to work group system 106 associated with the work group based on a position of the first service message in the queue.

FIGS. 4A-4G are diagrams of an overview of some non-limiting embodiments of an implementation 400 relating to process 300 shown in FIG. 3. As shown in FIGS. 4A-4G, implementation 400 may include Information Technology Service Management (ITSM) system 402, user device 404, and work group system 406. In some non-limiting embodiments, ITSM system 402 may be the same or similar to service management system 102, user device 404 may be the same as or similar to user device 104, and work group system 406 may be the same or similar to work group system 406 as described above.

Figure 4A:
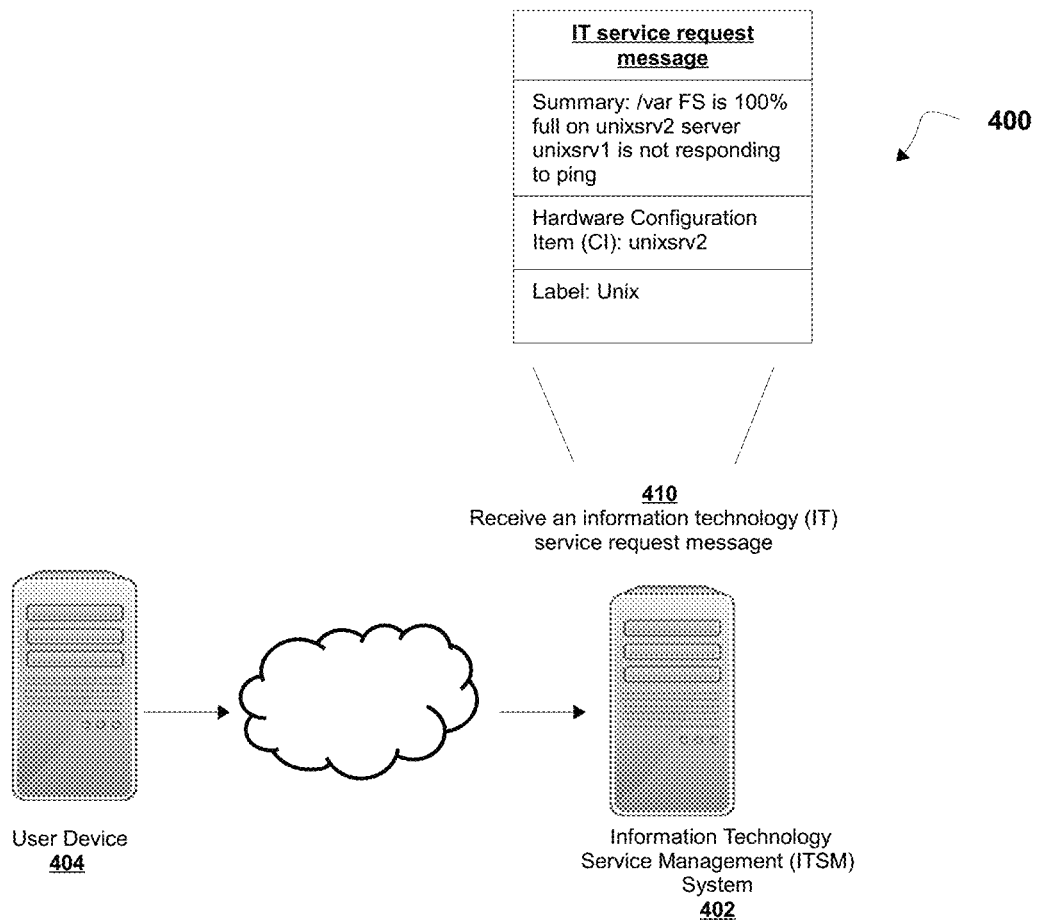
FIGS. 4A-4G are diagrams of an implementation of some non-limiting embodiments of the process shown in FIG. 3.

As shown by reference number 410 in FIG. 4A, ITSM system 402 may receive an information technology (IT) service request message. The IT service request message may include a label associated with a work group to which the IT service request message may be assigned. In some non-limiting embodiments, the IT service request message may include the label associated with the work group to which the IT service request message may be assigned so that the IT service request message may be used in a supervised machine learning process. For example, the IT service request message may include the label associated with the work group that is used to generate a machine learning model in a supervised machine learning process.

Figure 4B:
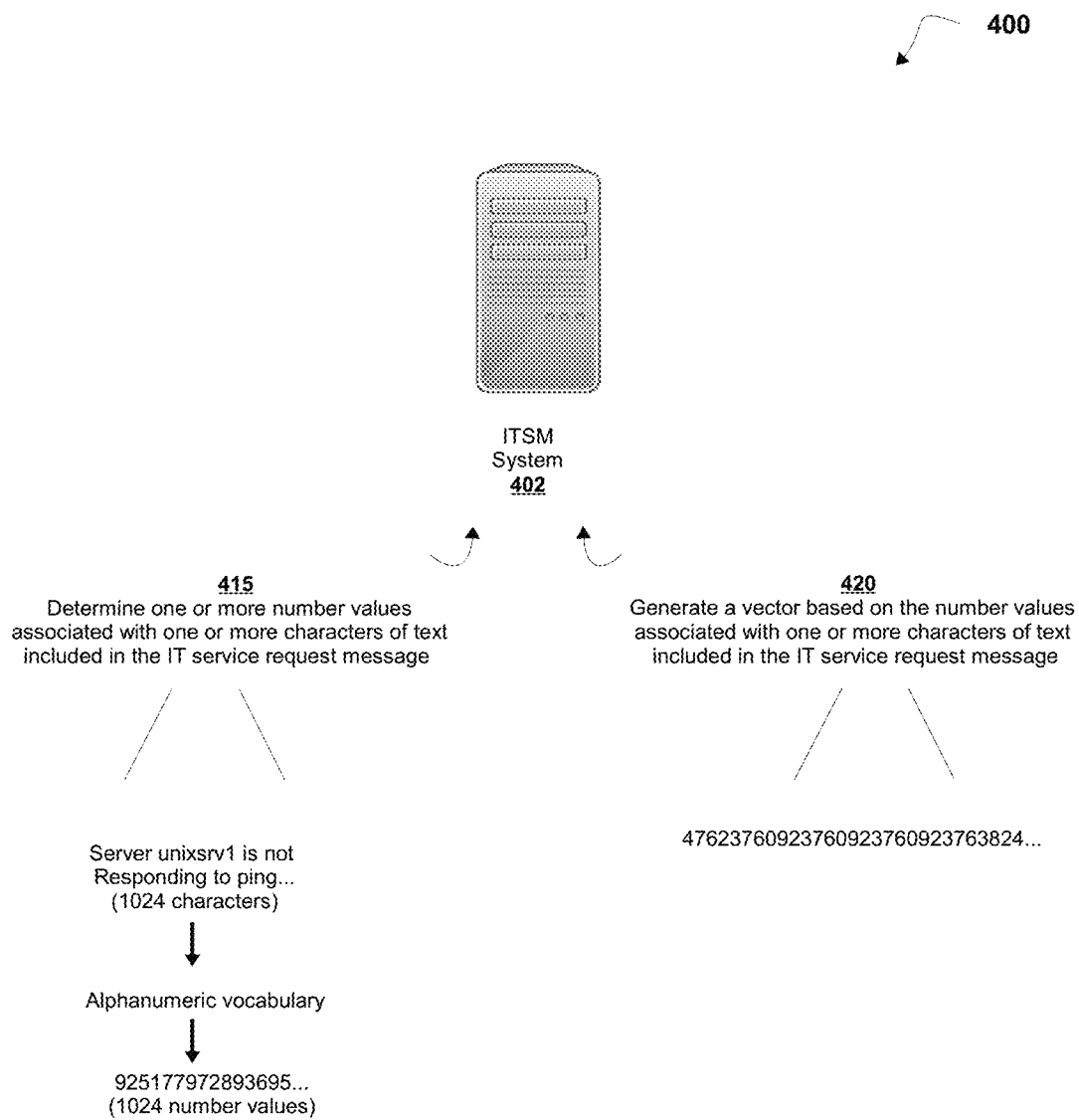

As shown by reference number 415 in FIG. 4B, ITSM system 402 may determine one or more number values associated with one or more characters of text included in the IT service request message. For example, ITSM system 402 may determine a plurality of number values associated with a plurality of characters of text included in the service request message based on an alphanumeric vocabulary. In another example, service management system 102 may determine a number value associated with each character of text included in the service request message based on an alphanumeric vocabulary. As further shown by reference number 420 in FIG. 4B, ITSM system 402 may generate a vector based on the number values associated with one or more characters of text included in the IT service request message. For example, ITSM system 402 may reference an index (e.g., an index associated with one or more characters of text included in the IT service request message) to a portion of a two-dimensional (2D) matrix (e.g., a uniformly randomized 2D matrix).

Figure 4C:
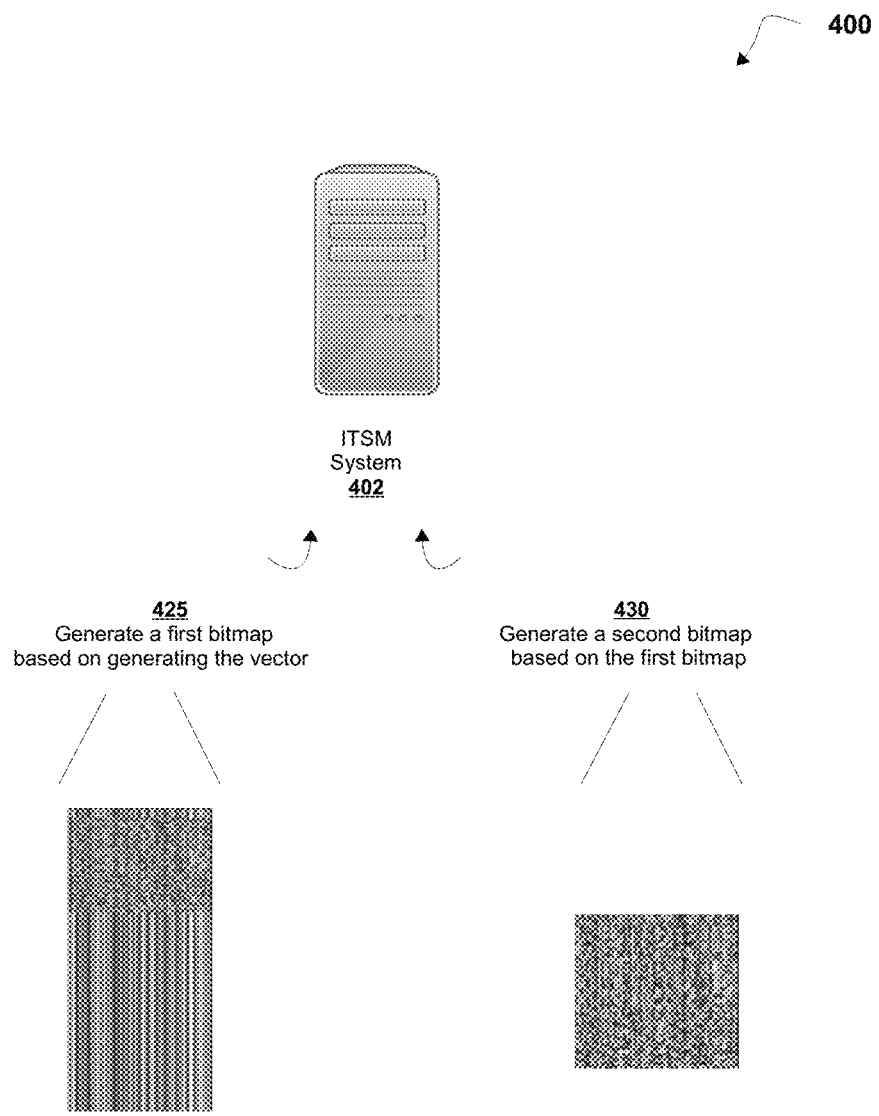

As shown by reference number 425 in FIG. 4C, ITSM system 402 may generate a first bitmap based on generating the vector regarding the number values associated with one or more characters of text included in the IT service request message. In some non-limiting embodiments, the first bitmap may include a first dimension (e.g., a length) and a second dimension (e.g., a width or a height), where the first dimension is larger than the second dimension. For example, the first bitmap may include the first dimension that is much larger than the second dimension, where the first dimension is larger than the second dimension by a multiplication factor. As further shown by reference number 430 in FIG. 4B, ITSM system 402 may generate a second bitmap based on the first bitmap. For example, ITSM system 402 may generate the second bitmap based on the first bitmap by multiplying the first bitmap by a vector (e.g., a weight vector) that a first dimension (e.g., a length) and a second dimension (e.g., a width or a height), where the second dimension is larger than the first dimension. In some non-limiting embodiments, the first dimension of the vector may be equal to a length of an embedding layer (e.g., a predetermined length of an embedding layer, a predetermined length of 32 characters, and/or the like.

Figure 4D:
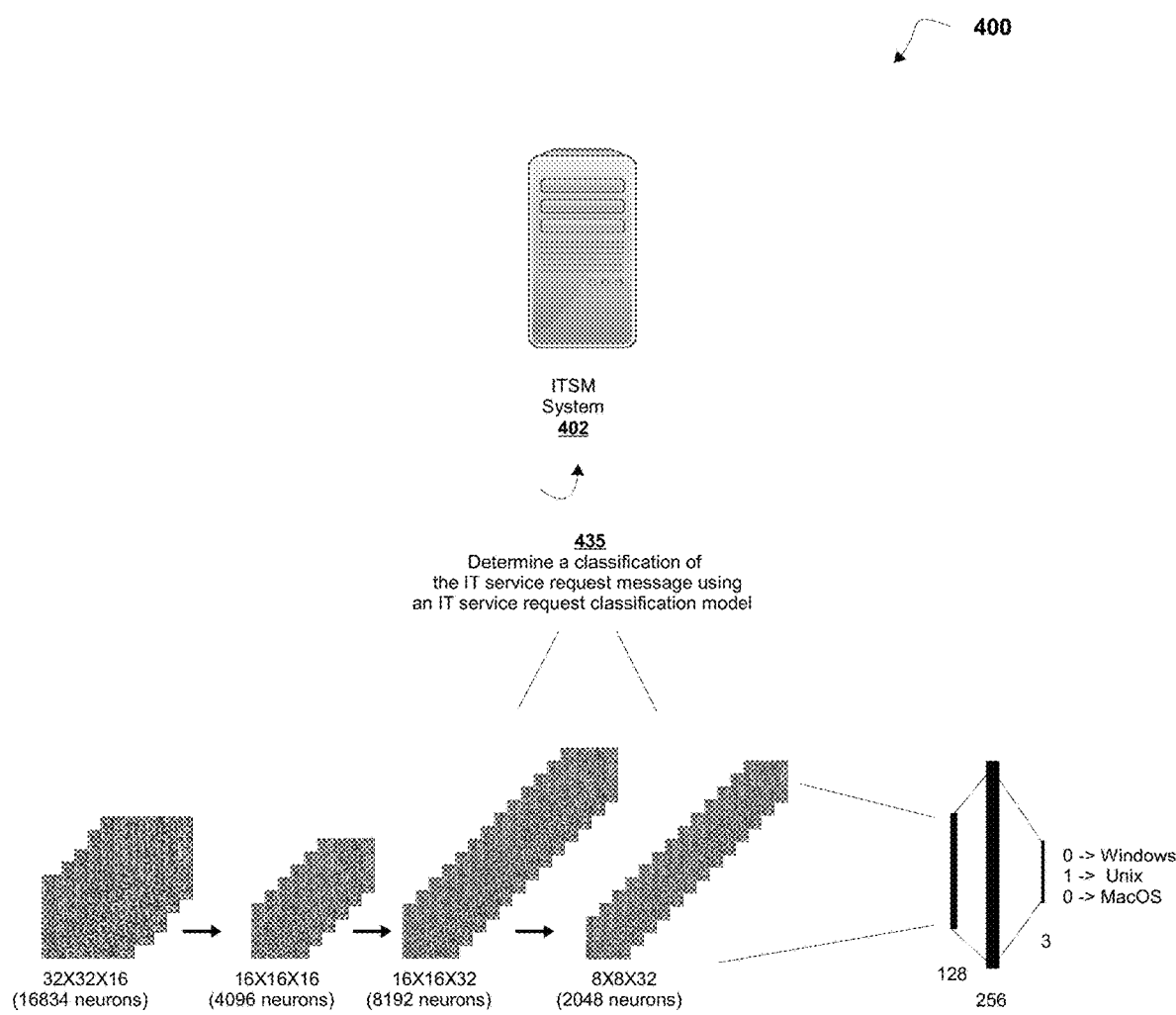

As shown by reference number 435 in FIG. 4D, ITSM system 402 may determine a classification of the IT service request message using an IT service request classification model. For example, ITSM system 402 may determine the classification of the IT service request message using the IT service request classification model. In some non-limiting embodiments, ITSM system 402 may determine that the classification of the IT service request message corresponds to the label associated with the work group to which the IT service request message may be assigned. For example, ITSM system 402 may determine that the classification of the IT service request message corresponds to the label associated with the work group to which the IT service request message may be assigned during a supervised machine learning process.

Figure 4E:
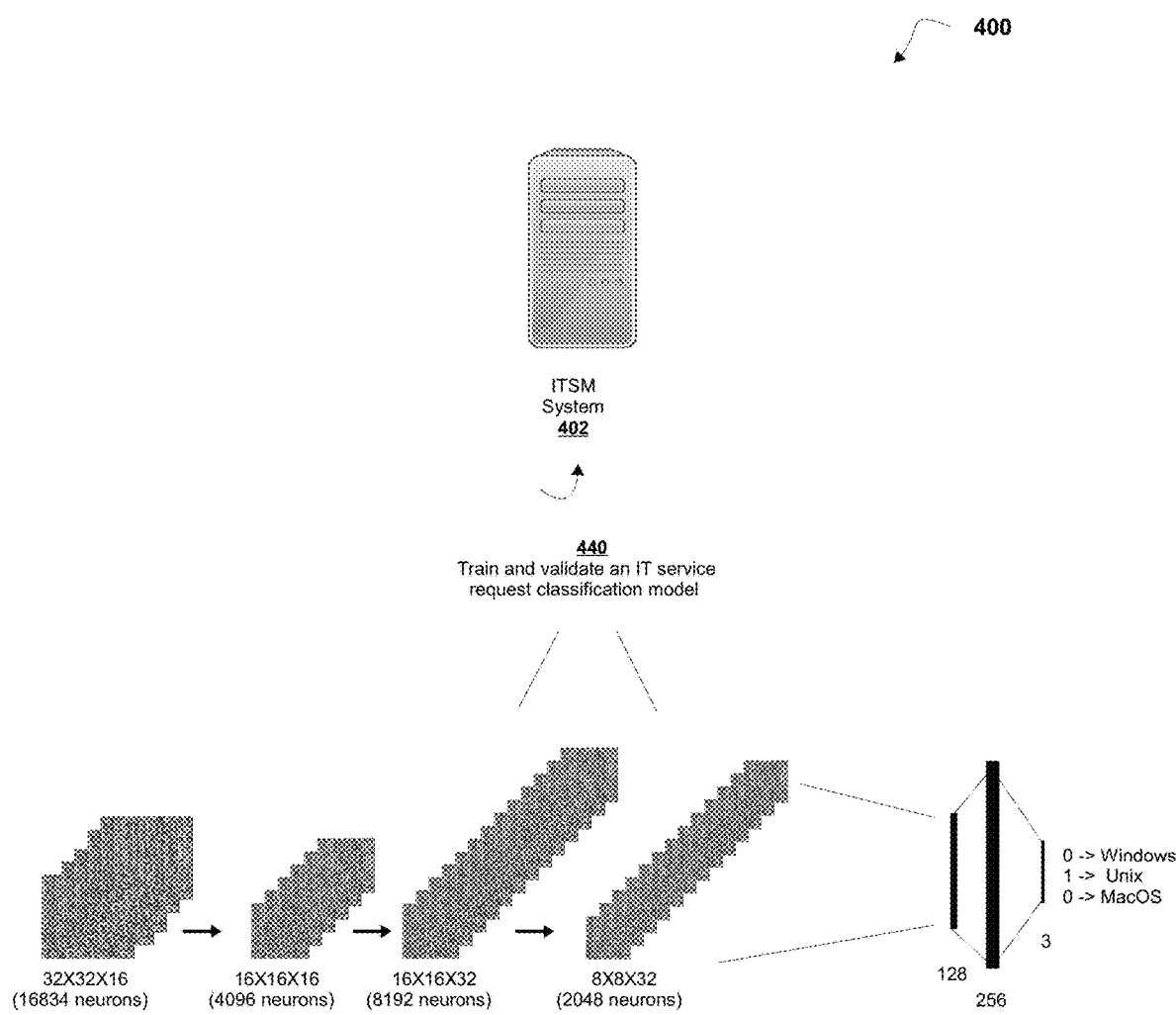

As shown by reference number 440 in FIG. 4E, ITSM system 402 may train and validate the IT service request classification model. For example, ITSM system 402 may train and validate the IT service request classification model that includes the first bitmap and the second bitmap as an embedding layer to the IT service request classification model.

Figure 4F:
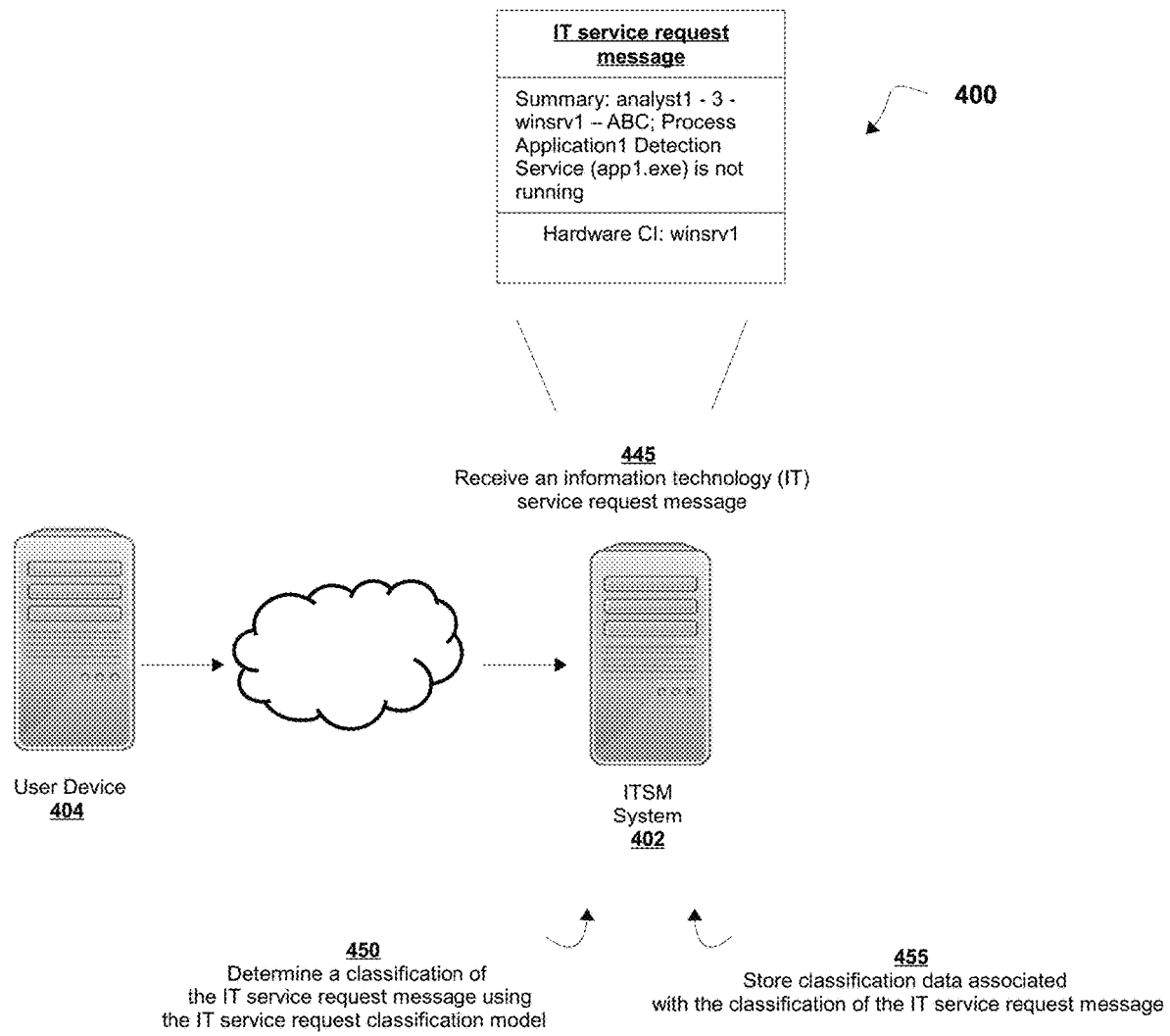

As shown by reference number 445 in FIG. 4F, ITSM system 402 may receive an information technology (IT) service request message. The IT service request message may not include a label associated with a work group to which the IT service request message may be assigned. As further shown by reference number 450 in FIG. 4F, ITSM system 402 may determine a classification of the IT service request message using the IT service request classification model that was trained and validated by ITSM system 402. As further shown by reference number 455 in FIG. 4F, ITSM system 402 may store classification data associated with the classification of the IT service request message. For example, ITSM system 402 may store the classification data associated with the classification of IT service request message in a data structure (e.g., a queue) that may be accessed by a device associated with a work group to which the IT service request message is assigned.

Figure 4G:
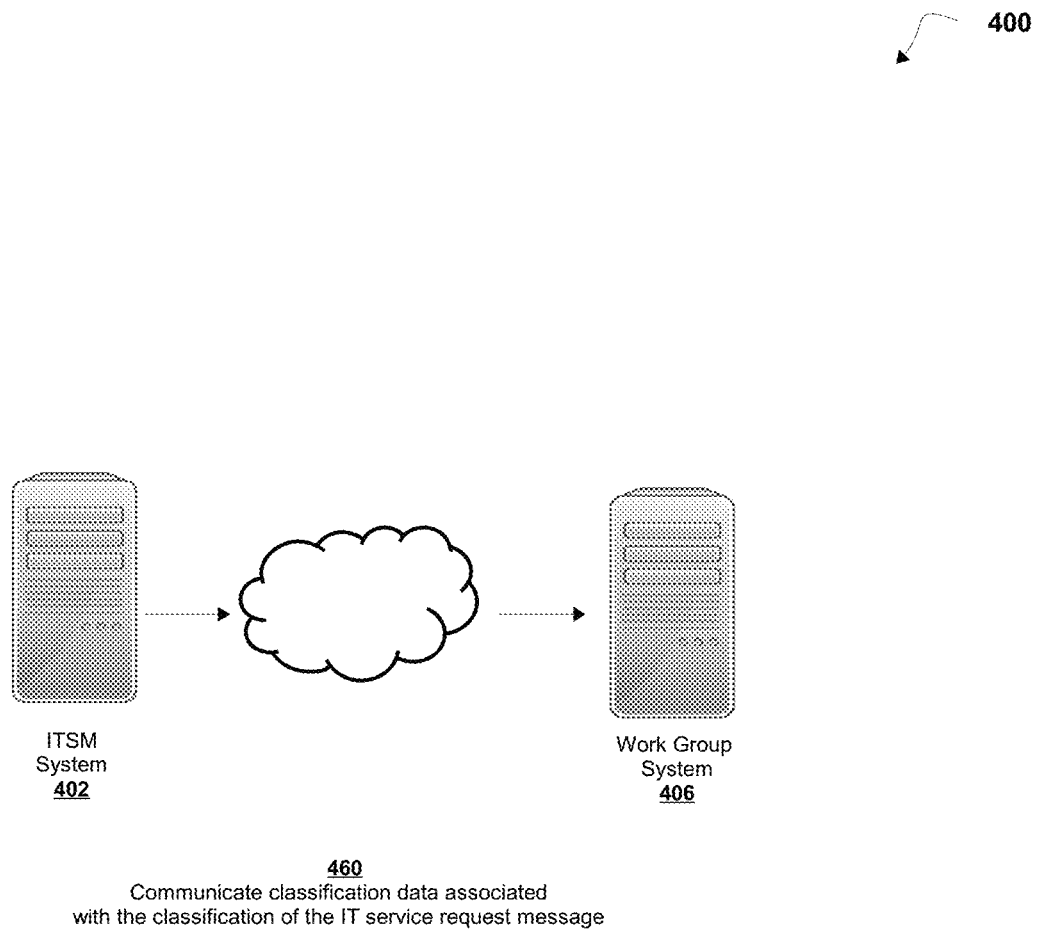

As shown by reference number 460 in FIG. 4G, ITSM system 402 may communicate classification data associated with the classification of the IT service request message to work group system 406. For example, ITSM system 402 may communicate a message to work group system 406 and the message may include the classification data associated with the classification of the IT service request message.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements. For example, it is to be understood that the present disclosure contemplates that, to the extent possible, one or more features of any embodiment can be combined with one or more features of any other embodiment.

What is claimed is:

1. A system comprising at least one processor programmed or configured to:
    generate a classification model configured to classify service request messages, wherein the classification model is configured to process a bitmap as an input and output a classification based on the bitmap;
    train the classification model with historical data;
    receive a first service request message;
    determine a first classification of the first service request message based on the classification model;
    generate a second service request message based on the first classification of the first service request message; and
    automatically communicate the second service request message to a work group system based on the first classification.

2. The system of claim 1, wherein generating the second service request message based on the first classification comprises including the first classification in the second service request message.

3. The system of claim 1, wherein the first classification comprises classification data including a label associated with the work group system.

4. The system of claim 1, wherein the classification model comprises a convolutional neural network.

5. The system of claim 1, wherein the first service request message comprises a first plurality of characters associated with text, and wherein the second service request message comprises a second plurality of characters.

6. The system of claim 1, wherein the at least one processor is further programmed or configured to:
    store classification data including the first classification in a data structure configured to be accessed by the work group system.

7. The system of claim 6, wherein the data structure comprises a queue of service request messages associated with the work group system, and wherein the second service request message is generated based on a position of the first service request message in the queue.

8. The system of claim 1, wherein determining the first classification of the first service request message based on the classification model comprises:
generating a first bitmap based on the first service request message;
generating a second bitmap based on the first bitmap; and
processing the second bitmap with the classification model.

9. A computer-implemented method comprising:
generating, with at least one processor, a classification model configured to classify service request messages, wherein the classification model is configured to process a bitmap as an input and output a classification based on the bitmap;
training, with at least one processor, the classification model with historical data;
receiving, with at least one processor, a first service request message;
determining, with at least one processor, a first classification of the first service request message based on the classification model;
generating, with at least one processor, a second service request message based on the first classification of the first service request message; and
automatically communicating, with at least one processor, the second service request message to a work group system based on the first classification.

10. The method of claim 9, wherein generating the second service request message based on the first classification comprises including the first classification in the second service request message.

11. The method of claim 9, wherein the first classification comprises classification data including a label associated with the work group system.

12. The method of claim 9, wherein the classification model comprises a convolutional neural network.

13. The method of claim 9, wherein the first service request message comprises a first plurality of characters associated with text, and wherein the second service request message comprises a second plurality of characters.

14. The method of claim 9, further comprising:
storing classification data including the first classification in a data structure configured to be accessed by the work group system.

15. The method of claim 14, wherein the data structure comprises a queue of service request messages associated with the work group system, and wherein the second service request message is generated based on a position of the first service request message in the queue.

16. The method of claim 9, wherein determining the first classification of the first service request message based on the classification model comprises:
generating a first bitmap based on the first service request message;
generating a second bitmap based on the first bitmap; and
processing the second bitmap with the classification model.

17. A computer program product comprising at least one non-transitory computer-readable medium including one or more instructions that, when executed by at least one processor, cause the at least one processor to:
generate a classification model configured to classify service request messages, wherein the classification model is configured to process a bitmap as an input and output a classification based on the bitmap;
train the classification model with historical data;
receive a first service request message;
determine a first classification of the first service request message based on the classification model;
generate a second service request message based on the first classification of the first service request message; and
automatically communicate the second service request message to a work group system based on the first classification.

* * * * *